(12) United States Patent
Suzuki et al.

(10) Patent No.: US 8,066,315 B2
(45) Date of Patent: Nov. 29, 2011

(54) ALL TERRAIN VEHICLE

(75) Inventors: Yasuhiro Suzuki, Shizuoka (JP);
Motoyuki Hara, Shizuoka (JP); Kouji Yamamoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 271 days.

(21) Appl. No.: 12/604,421

(22) Filed: Oct. 23, 2009

(65) Prior Publication Data
US 2011/0094819 A1 Apr. 28, 2011

(51) Int. Cl.
*B60J 7/00* (2006.01)
(52) U.S. Cl. .......................................... 296/70; 296/37.8
(58) Field of Classification Search ..................... 296/70, 296/74, 37.8, 24.34
See application file for complete search history.

(56) References Cited

U.S. PATENT DOCUMENTS

| | | | |
|---|---|---|---|
| 6,488,330 B2 * | 12/2002 | Hedderly | 296/192 |
| 7,287,795 B1 * | 10/2007 | Thomas | 296/24.34 |
| 2008/0015066 A1 | 1/2008 | Kato et al. | |
| 2009/0108617 A1 * | 4/2009 | Songwe, Jr. | 296/70 |

* cited by examiner

*Primary Examiner* — Joseph Pape
(74) *Attorney, Agent, or Firm* — Keating & Bennett, LLP (57) ABSTRACT

An all terrain vehicle includes a pair of right and left front wheels, at least a pair of right and left rear wheels, a vehicle body frame, a pair of right and left first roof supports, a pair of right and left second roof supports, a pair of right and left roof members, a seat, a front panel, a front upper cover, a meter unit and a cover. The front upper cover is connected to an upper portion of the front panel and extends forward in a longitudinal direction of the vehicle. The meter unit includes a display. The meter unit is disposed on the front panel such that the display is viewable from the seat. The meter unit is positioned in a transversely center portion of the vehicle. The cover extends from the front upper cover to the front panel so as to cover at least an upper portion of the meter unit. The cover is disposed in a higher position than an upper surface of the front panel in the transverse direction of the vehicle.

7 Claims, 7 Drawing Sheets

ALL TERRAIN VEHICLE

BACKGROUND OF THE INVENTION

1. Field of the Invention

The present invention relates to an all terrain vehicle, especially to an all terrain vehicle in which a meter unit is provided in a front panel.

2. Description of the Related Art

US Patent Publication No. 2008/0015066 A1 discloses an example of a conventional all terrain vehicle. The vehicle is provided with a cabin in which a seat is disposed. The cabin is disposed between front wheels and rear wheels in a longitudinal direction of the vehicle. Furthermore, a front panel is disposed forward of the cabin in the longitudinal direction of the vehicle. The front panel is opposed to the seat.

The vehicle of this type has a structure in which the cabin opens outward. The structure makes a driver feel openness of the cabin. However, soil, water, dust and the like enter the cabin due to its openness.

Additionally, according to the vehicle disclosed in the aforementioned patent application, a meter unit is disposed on a portion of the front panel. Specifically, the meter unit is opposed to a driver when he/she takes a seat. A variety of instruments (e.g., a speedometer) are disposed in the meter unit. The meter unit thus includes electric components, and is thereby required to be protected from intrusion of soil, water, dust and the like.

SUMMARY OF THE INVENTION

In view of the above, preferred embodiments of the present invention provide a vehicle in which intrusion of soil, water, dust and the like into electric components of a meter unit is prevented without impairing openness of a cabin of a vehicle.

An all terrain vehicle according to a preferred embodiment of the present invention includes a pair of right and left front wheels, at least a pair of right and left rear wheels, a vehicle body frame, a pair of right and left first roof supports, a pair of right and left second roof supports, a pair of right and left roof members, a seat, a front panel, a front upper cover, a meter unit and a cover. The vehicle body frame supports the front wheels and the rear wheels. The first roof supports are provided at lateral sides of the vehicle body frame in a transverse direction of the vehicle, respectively. Each of the first roof supports includes a pipe member extending in a substantially vertical direction of the vehicle. The second roof supports are provided at the lateral sides of the vehicle body frame in the transverse direction of the vehicle, respectively. The second roof supports are disposed rearward of the first roof supports in a longitudinal direction of the vehicle. Each of the second roof supports includes a pipe member extending in the substantially vertical direction of the vehicle. The right roof member connects an upper portion of the right first roof support and an upper portion of the right second roof support, whereas the left roof member connects an upper portion of the left first roof support and an upper portion of the left second roof support. The seat includes a seating surface positioned forward of the rear end of the second roof supports in a transverse side view of the vehicle. The front panel sections a cabin for accommodating a driver and a front space of a front section of the vehicle. The cabin includes the seat therein. The front space is positioned longitudinally forward of the cabin. The front upper cover is connected to an upper portion of the front panel. The front upper cover longitudinally extends forward. The meter unit includes a display portion. The meter unit is disposed on the front panel such that the display portion is viewable from the seat. The meter unit is positioned in a transversely center portion of the vehicle. The cover extends from the front upper cover to the front panel so as to cover at least an upper portion of the meter unit. The cover is disposed in a higher position than an upper surface of the front panel in the transverse direction of the vehicle.

According to a preferred embodiment of the present invention, the all terrain vehicle is provided with the cover arranged to cover an upper portion of the meter while extending from the forwardly-positioned front upper cover to the front panel. With this structure, it is possible to inhibit intrusion of soil, water, dust and the like into the interior of the meter unit from above. Additionally, the cover is positioned higher than the front panel. With this structure, it is possible to inhibit intrusion of soil, water, dust and the like into the meter unit from the front panel. In some cases, the cover may be positioned rearward of the front panel within the space for accommodating a driver. Even in the cases, the cover is disposed in the transversely center portion of the vehicle. With this structure, the cover does not impair the comfortableness of a driver and/or a passenger. In other words, comfortableness is reliably maintained while a driver and/or a passenger rides on the vehicle.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
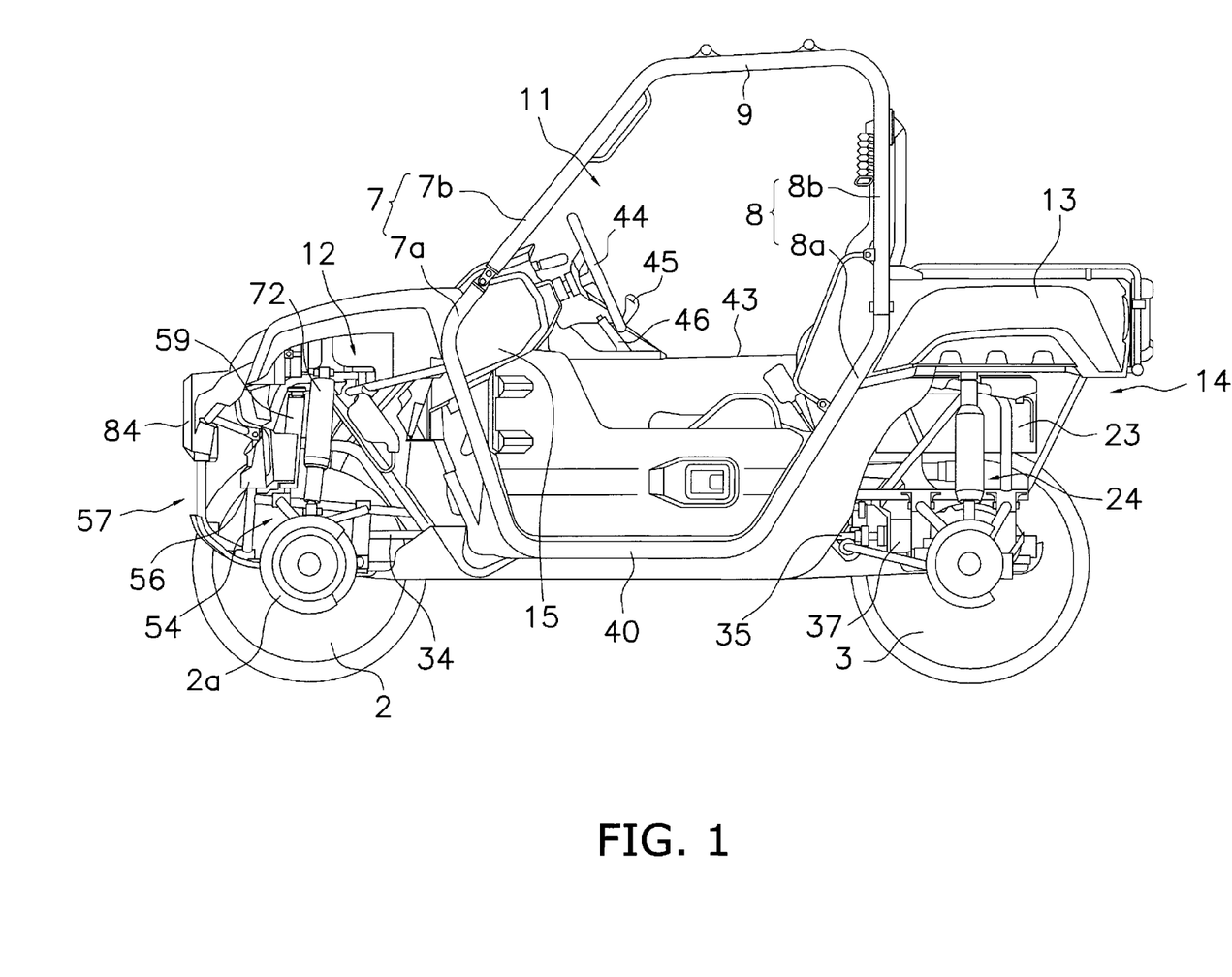
FIG. 1 is aside view of an all terrain vehicle according to a preferred embodiment of the present invention.
Figure 2:
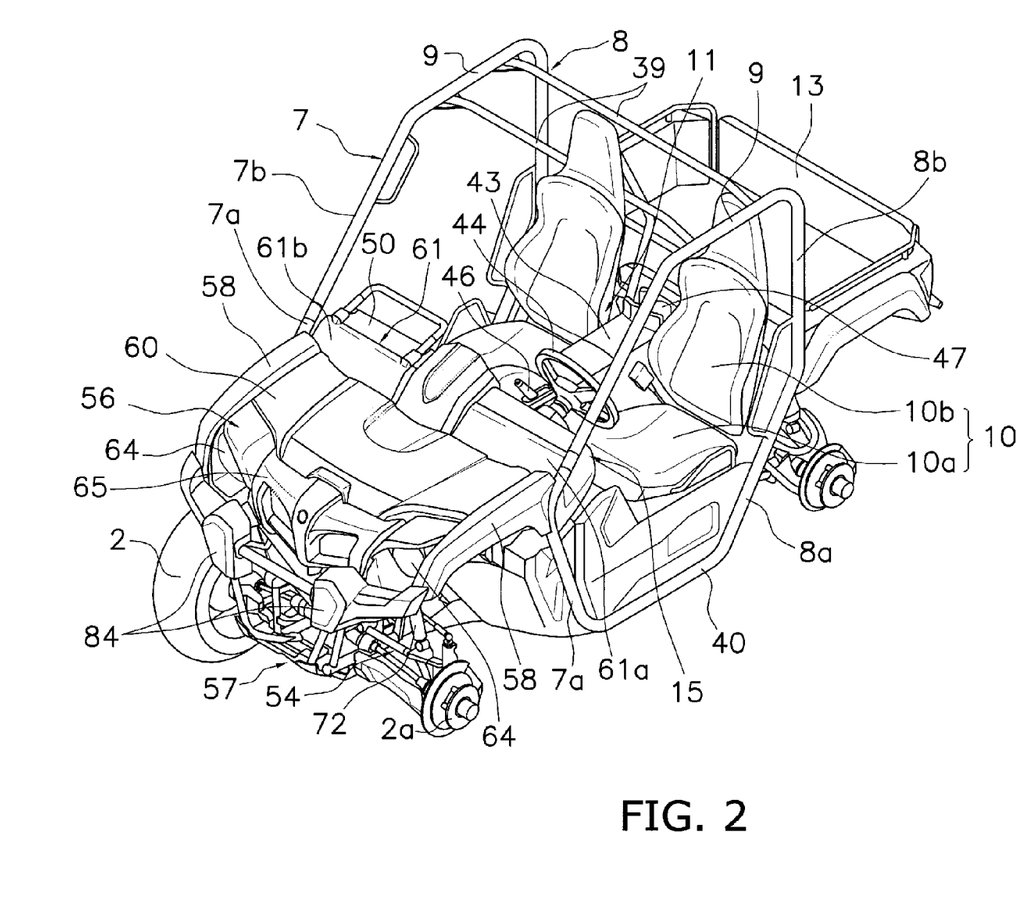
FIG. 2 is a perspective view of the entire all terrain vehicle.
Figure 3:
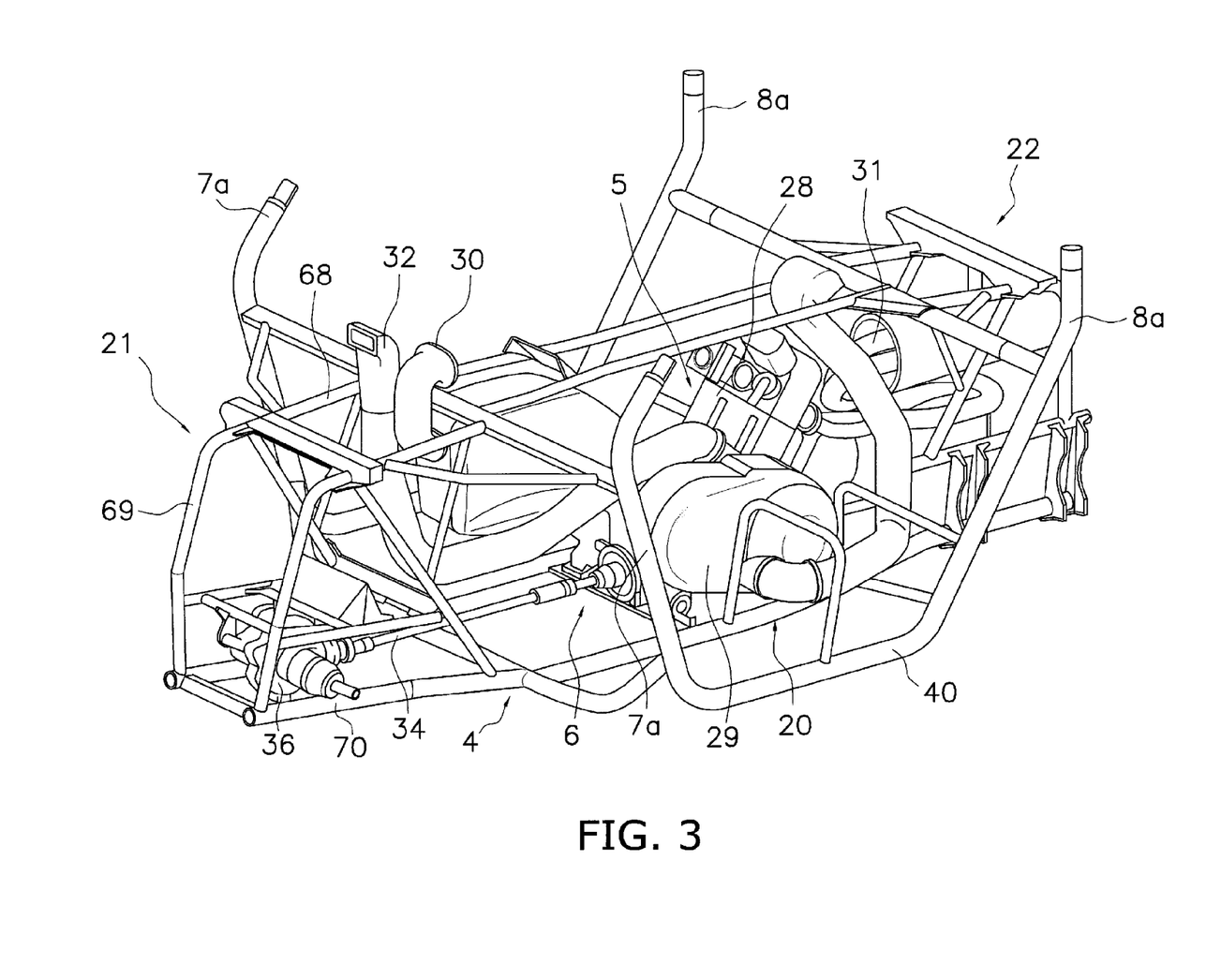
FIG. 3 is a perspective view of an entire vehicle body frame of the all terrain vehicle and a portions of mechanisms supported by the vehicle body frame.

FIG. 1 is a side view of an all terrain vehicle according to preferred embodiments of the present invention. FIG. 2 is a perspective view of the entire all terrain vehicle. FIG. 3 is a perspective view of a vehicle body frame and main members supported thereby, removed from the all terrain vehicle. Note FIG. 1 illustrates a condition of the all terrain vehicle that left-front and left-rear wheels are removed. FIG. 2 also illustrates a condition of the all terrain vehicle that the left-front and left-rear wheels are removed. FIG. 3 illustrates a condition of the vehicle body frame and main members supported thereby while upper portions of roof supports are removed. Excluding special occasions, directional terms "front," "rear," "right" and "left" and their related directional terms, used in the present specification, indicate directions seen by a driver riding on the vehicle.

The all terrain vehicle, illustrated in FIGS. 1 to 3, includes a pair of right and left front wheels 2, a pair of right and left rear wheels 3, a vehicle body frame 4, an engine unit 5, a power transmission mechanism 6, a pair of first roof supports 7, a pair of second roof supports 8, and a pair of roof members 9. The vehicle body frame 4 supports the front wheels 2 and the rear wheels 3. The power transmission mechanism 6 is configured to transmit power of the engine unit 5 to the front wheels 2 and the rear wheels 3. The first roof supports 7 and the second roof supports 8 are provided at transversely lateral sides of a longitudinally center portion of the vehicle body frame 4, respectively. Furthermore, the all terrain vehicle includes a cabin 11, a front space 12 and a rear space 14. The cabin 11 accommodates the seats 10. The cabin 11 thus functions as a space for carrying a driver and/or a passenger. The front space 12 is a front section of the vehicle disposed forward of the cabin 11. The rear space 14 is a rear section of the vehicle that a cargo 13 is disposed thereon. Additionally, a front panel 15 is provided between the cabin 11 and the front space 12. The cabin 11 and the front space 12 are thus sectioned by the front panel 15.

The vehicle body frame 4 mainly includes a center frame unit 20, a front frame unit 21 and a rear frame unit 22. The center frame unit 20 defines a bottom portion of the cabin 11. The front frame unit 21 is disposed in the front space 12 positioned forward of the center frame unit 20. The front frame unit 21 thus defines a front section of the vehicle. Additionally, the rear frame unit 22 is disposed in a rear space 14 positioned rearward of the center frame unit 20. The rear frame unit 22 thus defines a rear section of the vehicle.

Each of the center frame unit 20, the front frame unit 21 and the rear frame unit 22 preferably includes a plurality of pipe members. The center frame unit 20 supports the engine unit 5 through engine brackets (not illustrated in the figure). The front frame unit 21 supports a variety of components, including e.g., the front gear case 36, the right and left front suspensions 54 and the front carry bar 57. The rear frame unit 22 supports a variety of components, including e.g., the exhaust duct 23 and a pair of right and left rear suspensions 24.

The engine unit 5 occupies a range from transversely below the seats 10 to rearward of the seat units 10. As described above, the engine unit 5 is supported by the center frame unit 20 through the engine brackets. The engine unit 5 includes an engine body 28 and a V-belt type continuously variable transmission (CVT) 29. The CVT 29 is disposed leftward of the engine body 28. Note that an intake mechanism 30 and an exhaust mechanism 31 are connected to the engine body 28. The intake mechanism 30 (e.g., an air cleaner) is disposed in the front section of the vehicle whereas the exhaust mechanism 31 is disposed in the rear section of the vehicle. A cooling duct 32 is connected to the CVT 29 for mainly cooling a belt. The cooling duct 32 is disposed rearward of the front space 12. In other words, the cooling duct 32 is disposed in the portion positioned forward of the cabin 11.

The power transmission mechanism 6 includes a front drive shaft 34, a rear drive shaft 35, a front gear case 36 and a rear gear case 37. The front drive shaft 34 and the rear drive shaft 35 are connected to the output side of the CVT 29. The front gear case 36 is disposed among the tip of the front drive shaft 34 and the front wheels 2 whereas the rear gear case 37 is disposed among the tip of the rear drive shaft 35 and the rear wheels 3.

The pair of right and left first roof supports 7, the pair of right and left second roof supports 8 and the pair of right and left roof members 9 define a pair of right and left lateral frames of the cabin 11.

The first roof supports 7 form the front ends of the pair of right and left lateral sides of the cabin 11. Each of the first roof supports 7 preferably includes a pipe member extending in the substantially vertical direction. Each of the first roof supports 7 is divided into a lower support 7a and an upper support 7b. The lower support 7a and the upper support 7b are coupled preferably by a single or plurality of bolts, for example. The lower support 7a slants forward from its lower end to its upper end (i.e., a coupling portion with the upper support 7b). On the other hand, the upper support 7b slants rearward from its lower end (i.e., a coupling portion with the lower support 7a) to its upper end.

The second roof supports 8 define the rear ends of the pair of right and left lateral sides of the cabin 11. Each of the second roof supports 8 preferably includes a pipe member extending in the substantially vertical direction. Similarly to the first roof supports 7, each of the second roof supports 8 is divided into a lower support 8a and an upper support 8b. The lower support 8a and the upper support 8b are coupled preferably by a single or plurality of bolts, for example. The lower support 8a slants rearward from its lower end to its upper end (i.e., a coupling portion with the upper support 8b). On the other hand, the upper support 8b is disposed approximately upright.

Note each of the first and second roof supports 7 and 8 is preferably divided into lower and upper supports at its approximately vertical center portion. The coupling portions between the lower and upper supports are positioned at approximately the same height as the upper end of the front panel 15.

Each of the roof members 9 preferably includes a pipe member extending in the longitudinal direction. The right/left roof member 9 is provided between the upper end of the right/left first roof support 7 and the upper end of the right/left second roof support 8. The roof members 9 are approximately horizontally disposed. Furthermore, two coupling members 39 are disposed between the pair of right and left roof members 9. The roof members 9 are coupled by the coupling members 39.

The right and left lateral frames of the cabin 11 further include a pair of right and left lower members 40 in addition to the first roof supports 7, the second roof supports 8 and the roof members 9. Each of the lower members 40 preferably includes a pipe member. The right/left lower member 40 is disposed between the lower end of the right/left first roof support 7 and the lower end of the right/left second roof support 8. The lower members 40 are approximately horizontally disposed. The lower members 40 are thus opposed to the roof members 9 in the substantially vertical direction.

In the present preferred embodiment, the right/left upper support 7b of the right/left first roof support 7, the right/left upper support 8b of the right/left second roof support 8 and the right/left roof member 9 are formed preferably by bending a piece of a pipe member. Similarly, the right/left lower support 7a of the right/left first roof support 7, the right/left lower support 8a of the right/left second roof support 8 and the right/left lower member 40 are formed preferably by bending apiece of a pipe member.

As is obvious with reference to FIGS. 1, 2, 4A and 4B, the cabin 11 is provided with the front panel 15, a bottom floor panel 42 and a center console 43. The center console 43 is disposed between the right and left seats 10. The cabin 11 is defined as a space enclosed by the floor panel 42, the front panel 15, and a portion of the pair of right and left lateral frames (including the first and second roof supports 7 and 8 and the roof members 9) disposed above the front panel 15.

A handle 44 is disposed in front of the left seat 10 within the cabin 11. The seats 10 are disposed forward of the rear ends of the second roof supports 8 within the cabin 11. More specifically, each of the right and left seats 10 preferably includes a seating surface 10a and a back support 10b. The back support 10b supports the back of a driver/passenger. The back supports 10b of the seats 10 may overlap with the second roof supports 8 in the longitudinal direction. Alternatively, the back supports 10b may be partially positioned rearward of the second roof supports 8. However, the seating surfaces 10a of the seats 10 are preferably positioned forward of the rear ends of the second roof supports 8.

Furthermore, the center console 43 is disposed rearward of the front panel 15 while disposed in approximately the center portion of the vehicle in the transverse direction. The center console 43 extends rearward of the seats 10. The center console 43 includes left, right and upper walls. The center console 43 preferably has an inverse U-shape, and thereby includes an inner space. As illustrated in FIG. 1, a speed change control lever 45 and a side brake control lever 46 are disposed in the front portion of the center console 43 whereas a bottle receiver 47 (see FIGS. 2 and 4) is disposed on the rear portion of the center console 43 for receiving a single or plurality of beverage bottles.

Figure 5:
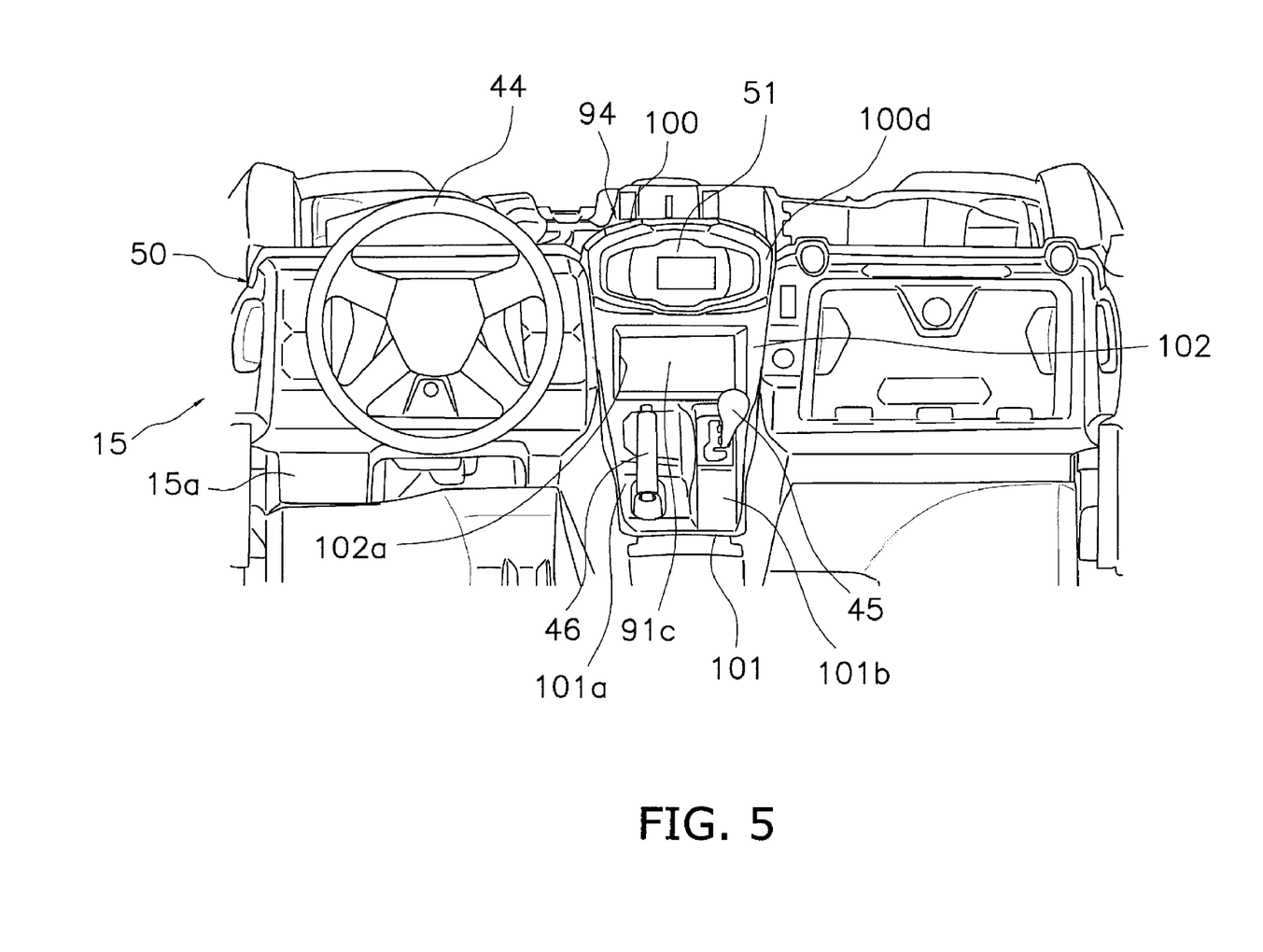
FIG. 5 is a forward view seen from within the cabin.

As described above, the front panel 15 is a member arranged to section the cabin 11 and the front space 12 positioned forward of the cabin 11. The front panel 15 includes a vertical panel 15a and a dashboard 50. The vertical panel 15a extends continuously upward from the floor panel 42 of the cabin 11. The dashboard 50 is disposed on the upper end of the vertical panel 15a. As illustrated in FIG. 5, the steering mechanism 44 is attached to the left portion of the dashboard 50 whereas a meter unit 51, including a display (e.g., a speedometer), is disposed in the transversely center portion of the dashboard 50. Electric components are installed in the interior of the meter unit 51. Note that structure of the dashboard 50 of the front panel 15 will be hereinafter explained in detail.

Next, the structure of the front section of the vehicle, that is, a cover structure of the front space 12 positioned forward of the front panel 15, will be hereinafter explained in detail.

As described above, the front frame unit 21 is disposed in the front space 12. As illustrated in FIGS. 1 to 3 and 6, the front frame unit 21 supports the front gear case 36, a pair of right and left front suspensions 54, a front box 55, a front cover 56, a front carry bar 57, a pair of right and left front fenders 58 and a radiator 59. Additionally, a main hood 60 is disposed between the front fenders 58, whereas a sub-hood 61 is disposed between the main hood 60 and the dashboard 50 of the front panel 15. In this case, the main hood 60 and the sub-hood 61 define a front upper cover 62. Moreover, right and left head light units 64 and a front grill 65 are attached to the front cover 56.

Figure 6:
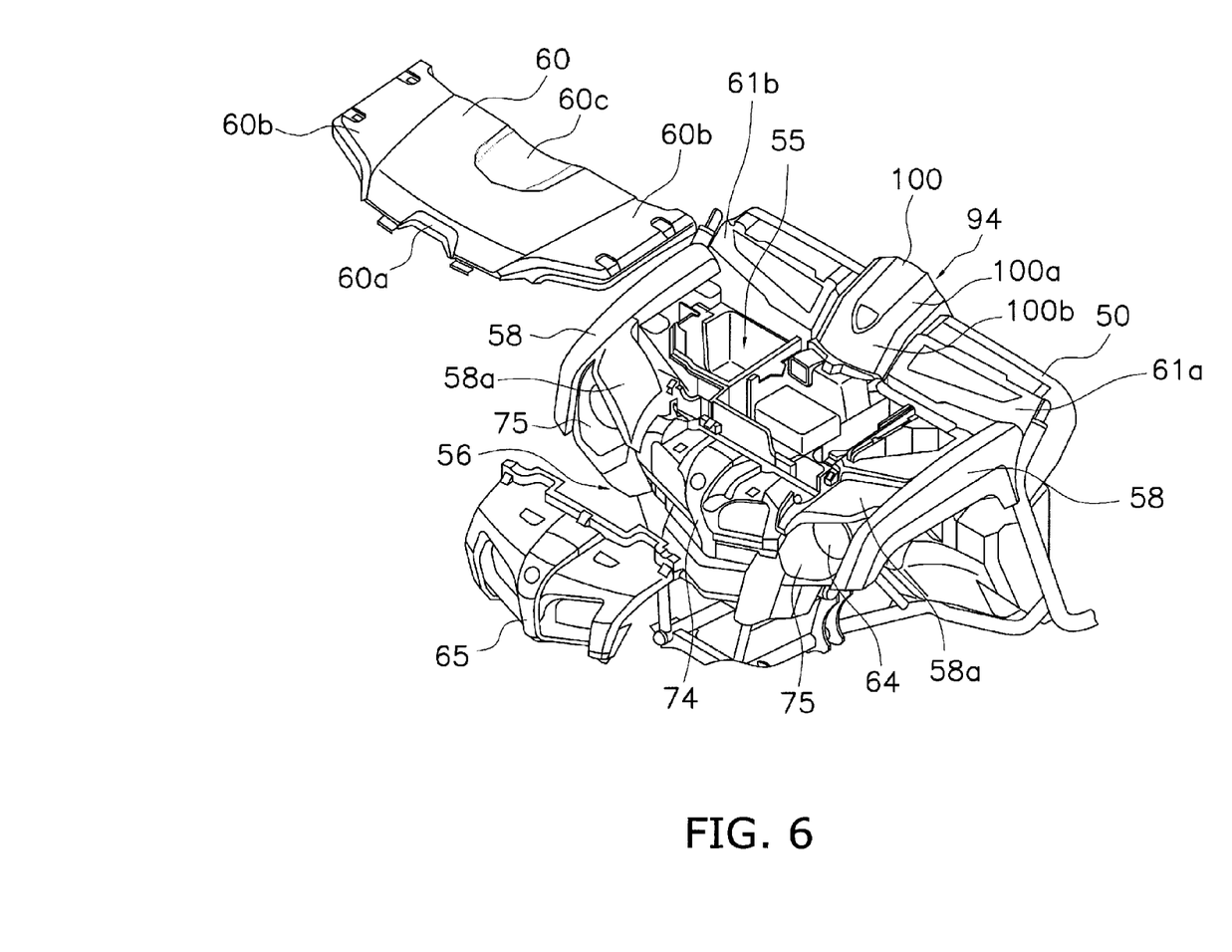
FIG. 6 is an exploded view of a front section of the all terrain vehicle while a cover is removed from the front section.

As illustrated in FIG. 6, the front cover 56 includes a center portion 74 and a pair of right and left head light covers 75. The center portion 74 is provided in approximately the center of the front cover 56 in the transverse direction, and includes an opening. The center portion 74 and the head light covers 75 preferably are integrally formed.

Additionally, the front grill 65 covers the front of the center portion 74 of the front cover 56.

The right and left front fender 58 cover above the right and left front wheels 2, respectively. As illustrated in FIG. 6, an extension 58a is provided in the front portion of each front fender 58. The extensions 58a extend toward the transverse center of the vehicle. The right/left extension 58a covers above the right/left head light cover 75.

The main hood 60 is disposed between the front fenders 58 for covering above the front box 55. The main hood 60 is detachably attached to the front fenders 58. Additionally, the main hood 60 entirely slants forwardly downward. A front protrusion 60a is provided in the transversely center portion of the front end of the main hood 60. The front protrusion 60a protrudes upward at a predetermined width. The front protrusion 60a opens forward. Moreover, the main hood 60 includes lateral end bulges 60b in its transversely lateral ends. The lateral end bulges 60b bulge at a predetermined width. The transversely center portion of main hood 60, interposed between the lateral end bulges 60b, is formed in an approximately flat shape. However, the transversely center portion includes a center bulge 60c in its transverse center. The center bulge 60c is positioned close to the front panel 15 (i.e., immediately adjacent to the sub-hood 61). The center bulge 60c bulges higher than the adjacent lateral sides of the transversely center portion. The center bulge 60c has a predetermined length in the longitudinal direction. The center bulge 60c opens rearward.

Figure 4A:
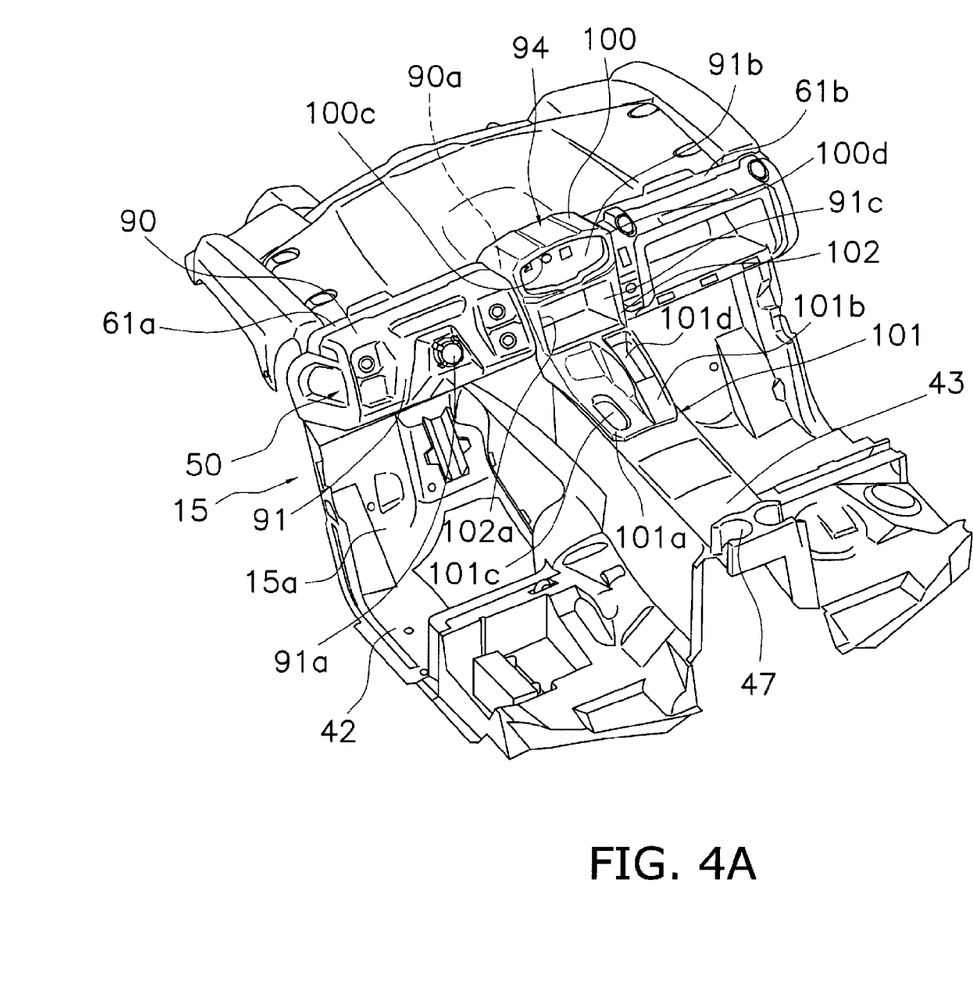
FIG. 4A is a perspective view of an entire front panel and its periphery.
Figure 4B:
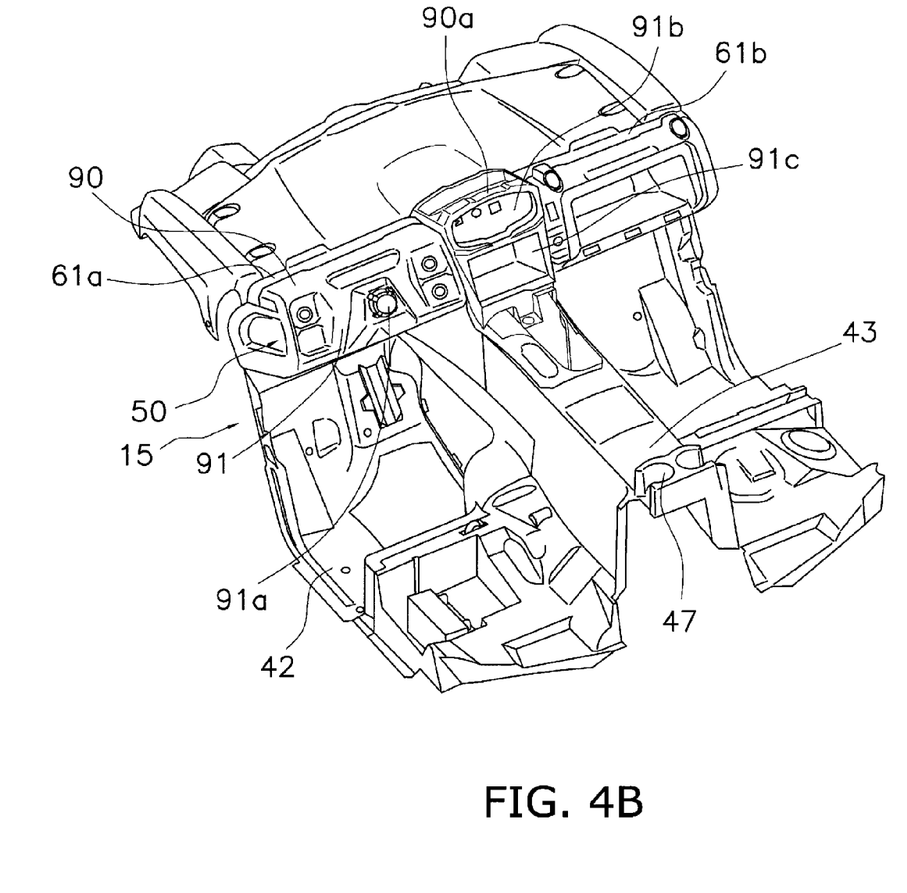
FIG. 4B is a perspective view of the entire front panel and its periphery while a cover is removed from them in FIG. 4A.

With reference to FIGS. 2, 4A, 4B and 6, the dashboard 50 and the sub-hood 61 will be hereinafter explained in detail. Note FIG. 4B illustrates the entire front panel 15 while a cover is removed therefrom in FIG. 4A.

The dashboard 50, defining a portion of the front panel 15, extends in the transverse direction of the vehicle. The transverse length of the dashboard 50 is approximately the same as that of cabin 11. The dashboard 50 includes a top surface 90 and a lateral surface 91. The top surface 90 slants forwardly downward whereas the lateral surface 91 slants rearwardly downward. As illustrated in FIG. 4B, a protrusion 90a is provided in the transversely center portion of the top surface 90. The protrusion 90a protrudes upward of its lateral sides. Additionally, a cover 94 is disposed so as to cover the protrusion 90a from the above. The cover 94 will be hereinafter explained in detail. Moreover, a support 91a is provided in the left portion of the lateral surface 91, whereas a meter unit attachment recess 91b is provided in the transversely canter portion of the lateral surface 91. The meter unit 51 is attached to the meter unit attachment recess 91b. The meter unit attachment recess 91b is recessed forward at a predetermined depth. Furthermore, a storage box 91c is located below the meter unit attachment recess 91b. The storage box 91c is used for storing small objects. The storage box 91c preferably is a rectangular-shaped recess. The storage box 91c is recessed forward at a predetermined depth. However, the depth of the storage box 91c is deeper than that of the meter unit attachment recess 91b.

The sub-hood 61 is longitudinally disposed between the top surface 90 of the dashboard 50 and the main hood 60. The sub-hood 61 includes right and left sub-hoods 61b and 61a. The left sub-hood 61a is disposed on the left side of the cover 94 whereas the right sub-hood 61b is disposed on the right side of the cover 94. The left and right sub-hoods 61a and 61b are separately formed. Portions of the left and right sub-hoods 61a and 61b, immediately adjacent to the top surface 90 of the dashboard 50, slant forwardly downward at approximately the same angle as the top surface 90. Additionally, the front ends of the left and right sub-hoods 61a and 61b forwardly slant at a steeper angle than their rear ends. The front ends of the left and right sub-hoods 61a and 61b are positioned at the same height as the top surface of the rear end of the main hood 60.

With the structure, the rear end of the sub-hood 61 defines a smoothly continuous surface with the top surface 90 of the dashboard 50, whereas the front end of the sub-hood 61 abuts to the rear end of the main hood 60 without any steps.

The front grill 65 is a member extending in the substantially vertical direction. The front grill 65 is attached to the front surface of the center portion 74 of the front cover 56. In other words, the front grill 65 is disposed rearward of the front carry bar 57. The front grill 65 and the center portion 74 of the front cover 56 block intrusion of soil and water (e.g., mud) into the interior of the vehicle from the front direction of the vehicle.

As illustrated in FIG. 4A, the cover 94 includes an upper cover portion 100, a lower cover portion 101 and a coupling portion 102. The upper cover portion 100 covers the upper portion of the meter unit 51 (i.e., the protrusion 90a of the top surface 90 of the dashboard 50) and the surrounding area of the front surface of the meter unit 51. The lower cover portion 101 covers the front portion of the center console 43. The coupling portion 102 couples the upper and lower cover portions 100 and 101.

The transverse length of the upper cover portion 100 is approximately the same as that of the protrusion 90a of the top surface 90 of the dashboard 50. Additionally, the transverse length of the upper cover portion 100 is the same as that of the center bulge 60c of the main hood 60. Furthermore, as illustrated in FIG. 6, the upper cover portion 100 is composed of a front-half portion 100b and a rear-half portion 100a.

The rear-half portion 100a protrudes upward of the top surface 90 of the dashboard 50. Slope of the rear-half portion 100a is approximately the same as that of the top surface 90 of the dashboard 50. On the other hand, the front-half portion 100b is interposed between the left sub-hood 61a and the right sub-hood 61b. The front-half portion 100b protrudes upward of the top surfaces of the right and left sub-hoods 61b and 61a. Slope of the front-half portion 100b is the same as slopes of the front ends of the right and left sub-hoods 61b and 61a. Furthermore, the front end of the front-half portion 100b extends to the same position as the front end of the sub-hood 61. The front end of the front-half portion 100b is positioned at the same height as the rear end of the center bulge 60c of the main hood 60. Therefore, there is no step between the front end of the upper cover portion 100 of the cover 94 and the main hood 60.

The upper cover portion 100 includes a transversely elongated oval opening 100c on a side opposite to the seat 10. Additionally, an opening rim 100d is provided on the surrounding of the opening 100c. The opening 100c is disposed in a position corresponding to the meter unit attachment recess 91b formed on the lateral surface 91 of the dashboard 50. The meter unit 51, attached to the meter unit attachment recess 91b, is viewable through the opening 100c from the seat 10. Additionally, the periphery of the meter unit 51 is covered with the opening rim 100d.

The lower cover portion 101 includes a left portion 101a and a right portion 101b. The left portion 101a preferably has an approximately flat shape along the top surface of the center console 43. The left portion 101a includes a longitudinally elongated opening 101c. The side brake control lever 46 penetrates the opening 101c from the bottom and extends upward (see FIGS. 1 and 5). On the other hand, the right portion 101b slants forwardly upward from its rear end. The right portion 101b includes a longitudinally elongated opening 101d. The speed change control lever 45 penetrates the opening 101d from the bottom and extends upward (see FIGS. 1 and 5). Note that right and left sealing members, including e.g., rubber (not illustrated in the figure), are attached to the openings 101c and 101d, respectively. The levers 45 and 46 penetrate the openings 101d and 101c through the right and left sealing members, respectively.

The coupling portion 102 includes a rectangular opening 102a. The opening 102a is formed in a position corresponding to the storage box 91c formed on the lateral surface 91 of the dashboard 50. With the structure, small objects and the like are allowed to be put in the storage box 91c through the opening 102a of the cover 94.

As described above, the front end of the cover 94 is approximately abutted to the rear end of the main hood 60, whereas the rear end of the cover 94 extends for covering the front portion of the center console 43 while the upper cover portion 100 and the coupling portion 102 cover the top surface 90 and the lateral surface 91 of the dashboard 50.

The cover 94 covers the upper portion of the meter unit 51. With the structure, it is possible to inhibit intrusion of soil, water, dust and the like to the meter unit 51 from above. Accordingly, it is possible to inhibit damage of the electric components provided in the interior of the meter unit 51.

The protrusion 90a, protruding upward of its lateral sides, is provided in the transversely center portion of the top surface 90 of the dashboard 50. The meter unit 51 is attached to the protrusion 90a. Additionally, the cover 94 is disposed above the protrusion 90a. With the structure, it is possible to inhibit intrusion of soil, water, dust and the like to the meter unit 51 through the front panel 15.

The cover 94 extends rearward from the front panel 15, and enters the interior of the cabin 11. However, the cover 94 is only disposed in the transversely center portion of the cabin 11. Therefore, the structure does not reduce the cabin space.

The cover 94 is only disposed in the transversely center portion of the cabin 11. Additionally, the front end of the cover 94 is disposed in the same position as the sub-hood 61, and its longitudinal length is short. With the structure, the cover 94 does not block frontward visibility of the vehicle.

The cover 94 covers the meter unit 51 while extending rearward so as to cover a portion that the speed change control lever 45 and the side brake control lever 46 are attached. With the structure, the cover 94 has a plurality of functions as a single member. Thus, the simple cover structure is achieved with the cover 94.

The rear end of the main hood 60 and the front end of the cover 94 are smoothly continuous. With this structure, it is possible to efficiently flow soil, water, dust and the like, coming from the front during driving of the vehicle, to the rearward. As a result, it is possible to inhibit accumulation of soil, water, dust and the like on the meter unit 51 and its periphery.

The aforementioned preferred embodiment exemplifies that each roof support preferably includes separately divided upper and lower supports. However, it is possible to apply preferred embodiments of the present invention to a type of vehicle provided with roof supports composed of only the upper supports described in the aforementioned preferred embodiment.

The meter unit 51 may be disposed in any suitable vertical and longitudinal positions on the front panel 15 as long as it is disposed in the transversely center portion of the front panel 15. For example, the meter unit 51 may protrude from the lateral surface 91 of the front panel 15 without forming a recess on the lateral surface 91.

In the aforementioned preferred embodiment, the rear portion of the cover 94 extends to the upper surface of the center console 43. However, the shape of the cover 94 is not limited to the aforementioned preferred embodiment. For example, the cover 94 may be provided only on the front panel 15.

The aforementioned preferred embodiment exemplifies the front upper cover 62, composed of the main hood 60 and the sub-hood 61. However, the front upper cover 62 may be composed of single member. Additionally, the aforementioned preferred embodiment exemplifies the sub-hood 61, composed of the right and left sub-hoods 61b and 61a. However, the sub-hood 61 may be composed of single continuous member.

In the aforementioned preferred embodiment, the present invention is preferably applied to a two-seat vehicle. However, it is similarly possible to apply the present invention to a type of vehicle provided with a rear seat(s) in addition to the front seats.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An all terrain vehicle comprising:
   a pair of right and left front wheels;
   at least a pair of right and left rear wheels;
   a vehicle body frame arranged to support the front wheels and the rear wheels;
   a pair of right and left first roof supports provided at lateral sides of the vehicle body frame in a transverse direction of the vehicle, respectively, each of the first roof supports including a pipe member extending in a substantially vertical direction of the vehicle;
   a pair of right and left second roof supports provided at the lateral sides of the vehicle body frame in the transverse direction of the vehicle, respectively, the second roof supports being disposed rearward of the first roof supports in a longitudinal direction of the vehicle, each of the second roof supports including a pipe member extending in the substantially vertical direction of the vehicle;
   a pair of right and left roof members, the right roof member connecting an upper portion of the right first roof support and an upper portion of the right second roof support, the left roof member connecting an upper portion of the left first roof support and an upper portion of the left second roof support;
   a seat including a seating surface positioned forward of a rear end of the second roof supports in a transverse side view of the vehicle;
   a front panel arranged to separate a cabin and a front space of a front section of the vehicle, the cabin including the seat therein, the front space being positioned longitudinally forward of the cabin;
   a front upper cover connected to an upper portion of the front panel and arranged to extend longitudinally forward;
   a meter unit including a display portion and arranged on the front panel such that the display portion is viewable from the seat, the meter unit being positioned in a transversely center portion of the vehicle; and
   a cover extending from the front upper cover to the front panel to cover at least an upper portion of the meter unit, the cover being disposed in a higher position than an upper surface of the front panel in the transverse direction of the vehicle.

2. The all terrain vehicle according to claim 1, wherein the front panel includes a recess in a transversely center portion thereof, the recess being recessed forward, and the meter unit is disposed in the recess.

3. The all terrain vehicle according to claim 1, further comprising:
   a transmission mechanism;
   a center console provided rearward of the front panel in the longitudinal direction of the vehicle, the center console including right, left, and top walls, the center console including an inner space, the center console extending rearward from a transversely center portion of the front panel to at least a front end of the seat in the longitudinal direction of the vehicle; and
   a shift operation member arranged to operate the transmission mechanism and disposed in an upper portion of the center console;
   wherein
   the cover extends rearward to a position where the shift operation member is disposed and includes an opening arranged to allow the shift operation member to penetrate upward therethrough.

4. The all terrain vehicle according to claim 1, further comprising a pair of right and left front fenders arranged to cover an area above the front wheels, respectively, wherein the front upper cover includes a main hood disposed between the front fenders in the transverse direction of the vehicle, the main hood being configured to be attachable/detachable to/from the front fenders, and a sub-hood disposed between the main hood and an upper end of the front panel in the longitudinal direction of the vehicle, the sub-hood sandwiching the cover in the transverse direction of the vehicle, the sub-hood slants forwardly and downward, and a portion of the cover sandwiched by the sub-hood slants forwardly and downward.

5. The all terrain vehicle according to claim 4, wherein the sub-hood includes a left sub-hood disposed on the left side of the cover in the transverse direction of the vehicle, and a right sub-hood disposed on the right side of the cover in the transverse direction of the vehicle, the right sub-hood being separate from the left sub-hood.

6. The all terrain vehicle according to claim 1, wherein a front end of the cover is disposed in substantially the same position as a front end of the sub-hood.

7. The all-terrain vehicle according to claim 4, wherein the main hood includes a bulge in its transversely center portion adjacent to the sub-hood, the bulge bulging upward relative to transversely lateral portions of the main hood, and the cover has substantially the same transverse length as the bulge, a front end of the cover extending to substantially the same position as a front end of the sub-hood, the cover smoothly continuing to the bulge.

* * * * *